United States Patent

Loebig

[11] Patent Number: 5,920,569
[45] Date of Patent: Jul. 6, 1999

[54] METHOD FOR STORING SUBSCRIBER-RELATED DATA IN COMMUNICATION SYSTEMS

[75] Inventor: Norbert Loebig, Darmstadt, Germany

[73] Assignee: Siemens Aktiengesellschaft, Munich, Germany

[21] Appl. No.: 08/713,443

[22] Filed: Sep. 13, 1996

[30] Foreign Application Priority Data

Sep. 15, 1995 [DE] Germany ............... 195 34 330

[51] Int. Cl.⁶ ............................................. H04Q 11/04
[52] U.S. Cl. ................................................... 370/424
[58] Field of Search ................... 370/424, 241, 370/524, 252, 395, 385, 249, 465, 347, 280, 216, 222, 223, 224, 225, 227, 228, 251, 422, 423, 429, 412, 522; 395/200.31, 200.79, 181, 182.03, 182.06, 163.21, 200–45; 340/825.01, 827; 379/221

[56] References Cited

U.S. PATENT DOCUMENTS 5,577,115  11/1996  Deutsch et al. ................. 370/359
5,636,202   6/1997  Garney ........................... 370/524

FOREIGN PATENT DOCUMENTS 0 631 449 A2  12/1994  European Pat. Off. .
34 446 49 C2   7/1989  Germany .
19506961       2/1995  Germany .

*Primary Examiner*—Dang Ton
*Attorney, Agent, or Firm*—Hill & Simpson

[57] ABSTRACT

In the prior art, the storing of subscriber-related data ensues in the peripheral installations of the communication system. This requires a great deal of memory space. In order to minimize this, the subscriber-related data is stored, per interface to a subscriber connection network, in only one of the peripheral installations, or, if redundancy is required, in two of them.

15 Claims, 3 Drawing Sheets

METHOD FOR STORING SUBSCRIBER-RELATED DATA IN COMMUNICATION SYSTEMS

BACKGROUND OF THE INVENTION

The method is for storing subscriber-related data in communication systems having a plurality of subscriber connection networks.

Prior Art communications systems have non-redundant peripheral installations. These are for example connection installations for subscribers or for circuit lines that represent connections to other communications systems. In addition, communications systems have central installations that are at least duplicated due to requirements of reliability. These include, for example, the central control installation, coupling fields, protocol terminating installations, background memories and operating installations. All of these installations are single or multiple processor systems, controlled by software.

The peripheral installations fulfill essential switching-oriented tasks connected with the speech channels of the respective peripheral installation. They thus contain switching-oriented, operation and maintenance-oriented and administrative programs, as well as the data information associated with the installation. To the latter, there belong in particular subscriber-related data, such as data concerning the connection state, the signaling, the authorizations and call numbers. In addition, there belong hereto individual data with regard to connection lines, as well as data concerning the state of expansion and configuration of the peripheral installation. Thus, per 100 subscribers several megabytes of memory requirement can arise in the peripheral installations for the subscriber-related data just mentioned.

Modern subscriber connection networks are as a rule connected to the peripheral installations of the communications system via standardized interfaces, in Europe in particular via what are called V5 interfaces. There are up to three of what are called V5.2 communication channels (or C-channels) per PCM30 path of a V5.2 interface, which are provided in order to convey the central protocols as well as the PSTN signaling, the ISDN signaling and the ISDN D-channel packet data of administratively allocated V5.2 subscribers. The peripheral installations are connected among one another and with the common central control installation via a message distribution system, generally duplicated, which handles central and coordinating tasks. An interface to subscriber connection networks can have more than one PCM path (e.g. up to 16 PCM30 systems for V5.2 interfaces in full expansion), depending on the number of connected subscribers, as well as their traffic behavior. It is thus necessary in certain circumstances that a multiplicity of peripheral installations must be used for the preparation of such an interface in a communication system.

Since concentrating interfaces in particular, such as the V5.2 interfaces, have no fixed allocation between the subscriber and the speech channel of the interface to the communication system, a peripheral installation of the communication system must have access to the totalities of the subscriber data of those interfaces to subscriber connection networks that convey at least one PCM path to the relevant peripheral installations.

From the German patent application P 195 069 61.7, a method is known for the connection of V5.2 interfaces to the peripheral installations of a communication system. The connection thereby ensues in such a way that a failure of subscribers allocated to the interfaces, caused by a failure of a peripheral installation, can be avoided. This is achieved through the connection of one defined logical communication ring per V5.2 interface, which can be physically realized e.g. via the coupling field, and enables the intensive exchange of messages of the peripheral installations that conduct speech channels of the same V5.2 interface. The subscriber-related data of the subscribers connected via one of these interfaces are stored as an interface-specific totality in the peripheral installations that conduct speech channels of the interface. If a peripheral installation conducts speech channels of several interfaces, the several totalities of the subscriber-related data of these interfaces are stored in this peripheral installation. A problem with this way of proceeding is that each peripheral installation must keep ready considerable memory resources for the storing of the subscriber-related data.

SUMMARY OF THE INVENTION

It is an object of the present invention to provide a method by which the average memory requirement in the peripheral installations of a communication system can be minimized.

An advantageous feature of the present invention is the storing of subscriber-related data of an interface in only one part of the peripheral installations that conduct speech channels of this interface. Hereby the average number of subscriber-related data to be stored per peripheral installation is significantly smaller than the average of the sums of the subscriber-related data of all interfaces to subscriber connection networks connected to the respective peripheral installation, which average number is formed over all peripheral installations. The advantage is that only the peripheral installations that conduct the subscriber-related data need be equipped with corresponding memory means. The remaining peripheral installations can then comprise less strongly dimensioned memory means. The average memory requirement of the peripheral installations in the communication system is thereby reduced.

Advantageous developments of the present invention are as follows.

It is provided that each of the totalities of the subscriber-related data of the subscribers connected via one of the interfaces is respectively stored in exactly one of the peripheral installations. The method is hereby also advantageously usable in communication systems with duplicated peripheral installations.

It is provided that each of the totalities of the subscriber-related data of the subscribers connected via one of the interfaces is respectively stored in exactly two of the peripheral installations. The method is hereby also advantageously usable in communication systems with unduplicated peripheral installations, in which, as is generally the case, the desired security against failure is already achieved through a duplicated keeping of the subscriber data sets in different peripheral installations. The advantage is that the memory means required for storing need be provided in only one of these peripheral installations.

It is provided that the transmission medium is a system of communication rings, connected in a coupling field in such a way that it joins the peripheral installations connected with the same interface. The advantage is that subscriber-related data can be exchanged rapidly and efficiently via a communication ring between the individual peripheral installations.

It is provided that a peripheral installation that conducts subscriber-related data, which installation requires particular subscriber-related data during the execution of switching-oriented processes, takes these data from the system-inherent database, if necessary. The advantage is that the communication ring is dynamically relieved of stress.

It is provided that a peripheral installation, which during the execution of switching-oriented processes requires particular subscriber-related data that it does not keep, takes these data from a respectively allocated system-inherent intermediate memory, or, alternatively, takes them from the peripheral installation in which these subscriber-related data are stored, and in the latter case supplies these data to the respectively allocated system-inherent intermediate memory. The advantage is that the number of memory means in the peripheral installations can be kept low.

It is provided that administrative amendments of subscriber-related data are carried out in the database of the central control installation, whereupon an updating of these data is carried out by this central control installation in the peripheral databases of the peripheral installations that keep the relevant subscriber-related data, and, if necessary, an updating or invalidation of these data is effected in the peripheral intermediate memories. The advantage is that the peripheral installations always have an updated representation of the subscriber-related data.

It is provided that the interfaces are V5.2 interfaces, and the peripheral installation that terminates the primary link is preferably defined as a peripheral installation that conducts subscriber-related data, and, in addition, if necessary the peripheral installation that terminates the secondary link is defined as an additional peripheral installation that keeps subscriber-related data. The advantage is that the storing of subscriber-related data is incorporated into the terminal design of V5.2 interfaces, and the communication requirement between the peripheral installations, and thus the demand placed on the associated message distribution system, is reduced.

It is provided that the central control installation keeps the subscriber-related data in a system-inherent database as the sole installation of the communication system, and makes the peripheral installations available as needed. The advantage is that the memory means in the peripheral installations can be further reduced.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
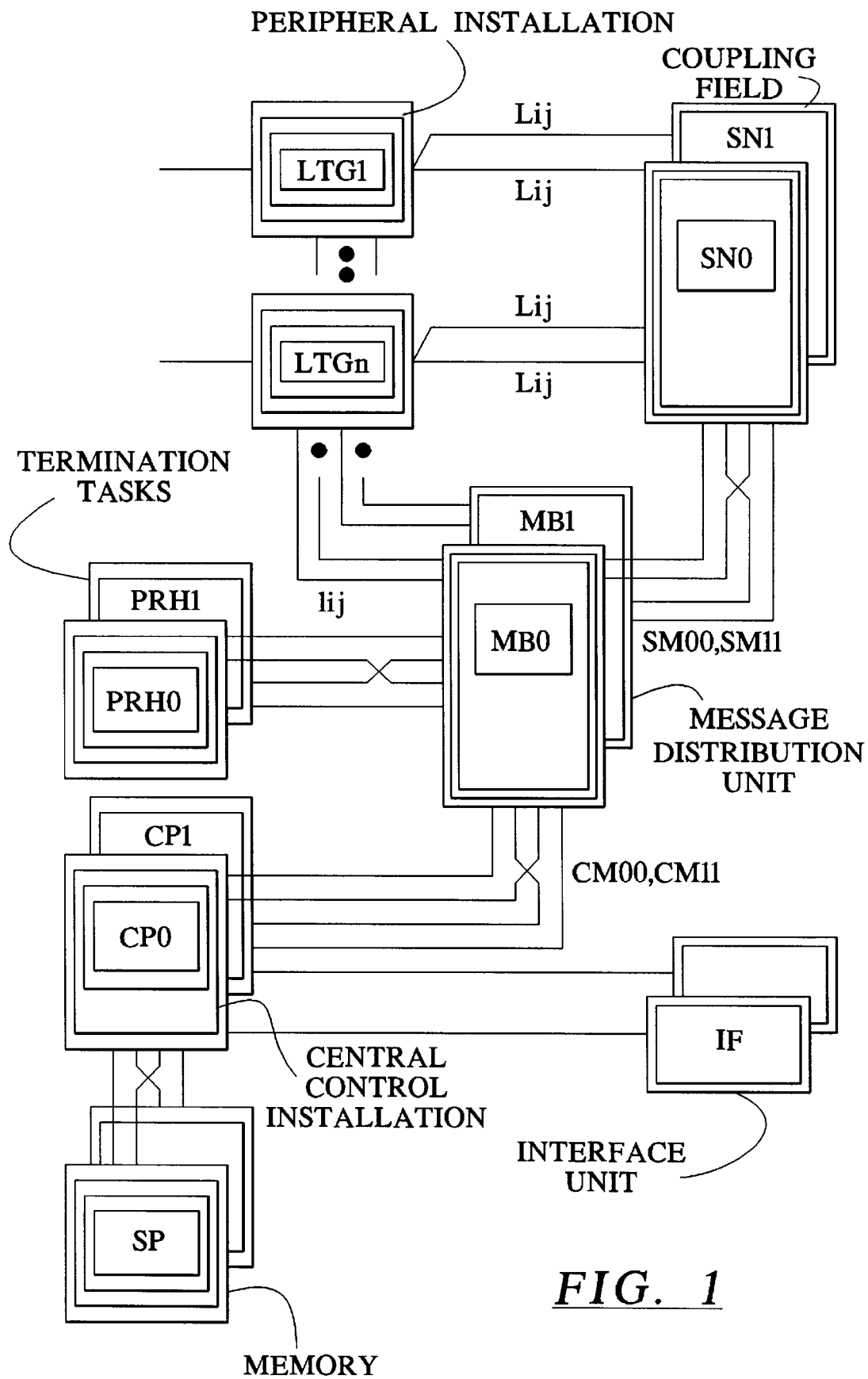
FIG. 1 depicts the typical system. architecture of a communication system.

FIG. 1 shows the typical system architecture of a communication system with unduplicated peripheral installations $LTG_1 \ldots LTG_n$. They are connected at the output side with subscribers or, respectively, with further communication systems. The information coming from both of the latter two is received by the peripheral installations $LTG_1 \ldots LTG_n$ and supplied to the redundantly fashioned coupling field SN0, SN1 via connections Lij. In addition, the peripheral installations $LTG_1 \ldots LTG_n$ are connected with the redundantly fashioned message distribution units MB0, MB1 via further connections Iij, which units are themselves connected, via further connections Iij, with the redundantly fashioned installations for the processing of central protocol termination tasks PRH (e.g. central character channel for no. 7 signaling; access to packet networks), and are connected with the coupling field SN0, SN1, as well as with the likewise redundantly fashioned central control installation CP0, CP1. The latter is connected to a duplicated mass memory SP. In addition, interface units IF are provided at the central control installation CP0, CP1 for the connection of operating devices or, respectively, for the alarming of the maintenance personnel. The coupling field SN0, SN1, the message distribution units MB0, MB1, the installations for the processing of central protocol termination tasks PRH0, PRH1, the central control installation CP0, CP1, as well as the mass memory SP and the interface units IF are thus respectively provided in the communication system in duplicated form. The peripheral installations $LTG_1 \ldots LTG_n$, on the other hand, are embodied in unduplicated form in the present exemplary embodiment.

Figure 2:
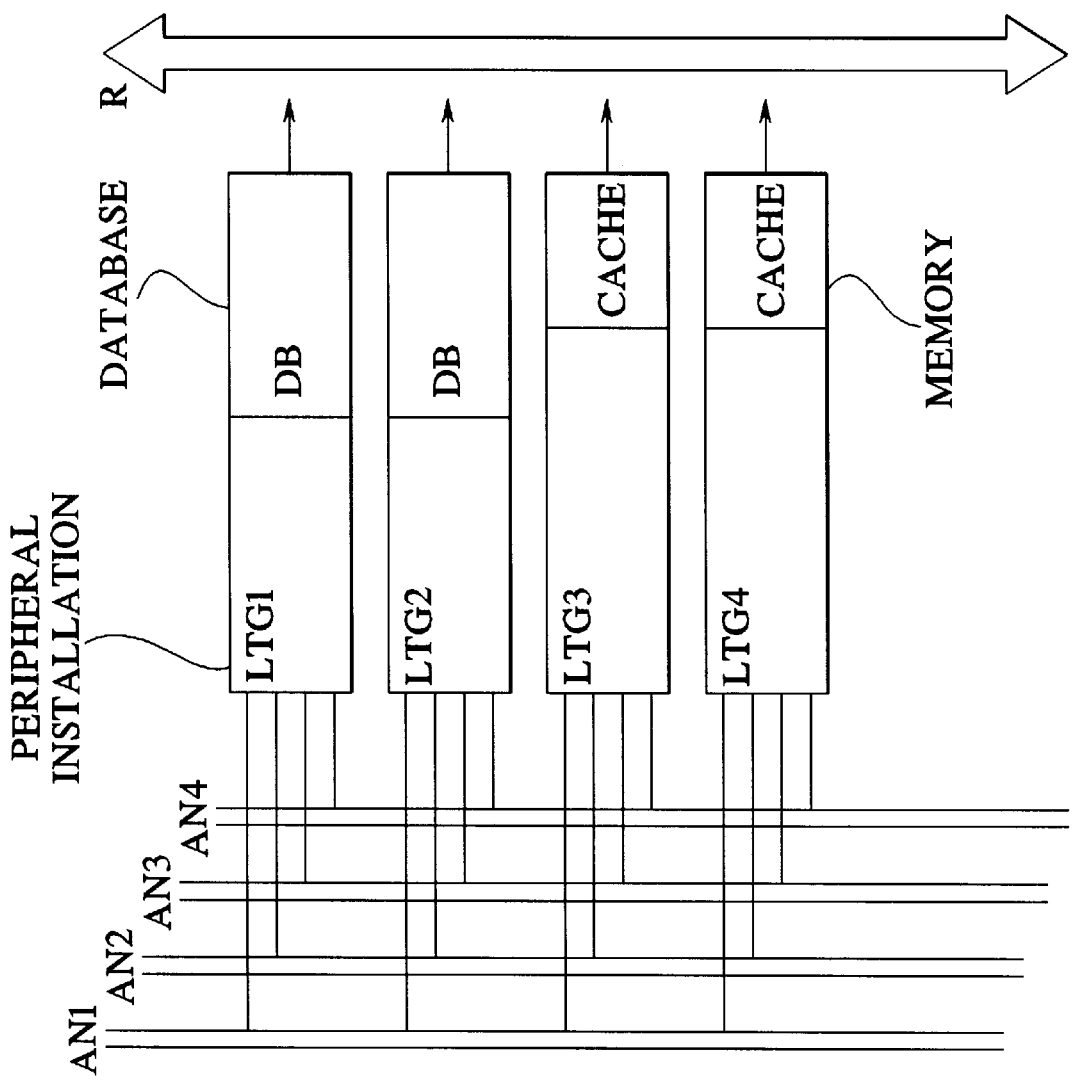
FIG. 2 depicts a configuration in which system-wide only one peripheral installation, and, for reasons of redundancy, a further peripheral installation, keep subscriber-related data.

FIG. 2 shows how subscriber-related data is stored in peripheral installations $LTG_1 \ldots LTG_4$. It is assumed in the example that four subscriber connection networks AN1 ... AN4 are connected to the communication system via four V5.2 interfaces S1 . . . S4. The subscriber connection network AN1 is thereby conducted to the peripheral installations $LTG_1 \ldots LTG_4$ respectively via a total of 4 PCM30 systems. In the same way, the subscriber connection network AN2 is connected to the peripheral installations $LTG_1 \ldots LTG_4$, likewise via four PCM30 systems. The same procedure holds for the subscriber connection networks AN3, AN4.

Let it be further assumed for the example that all the subscriber-related data of the subscriber connection networks AN1 . . . AN4, connected via the V5.2 interfaces in question, are stored in the peripheral installation $LTG_1$. The data is stored in a database DB of this peripheral installation. For reasons of redundancy, this data is also stored in the peripheral installation $LTG_2$, in the peripheral database DB inherent to the system there. The database DB of the peripheral installation $LTG_2$ can thereby be accessed without difficulty in case of error, that is, in particular in case of failure of the peripheral installation $LTG_1$. Since in the present exemplary embodiment unduplicated peripheral installations were assumed, it is in general quite useful for failure-related reasons to store and keep the corresponding database identically in two peripheral installations. The further peripheral installations (in the present exemplary embodiment, these are the peripheral installations $LTG_3$, $LTG_4$) have no databases for the storing of subscriber-related data. The peripheral installations are joined for the handling of the intensive internal message load arising per V5.2 interface via an efficient message distribution system, which for example can be a ring system R connected via the coupling field. The construction of a configuration of this sort is specified in detail in the German patent application P 195 069 61.7.

The peripheral installations $LTG_3$, $LTG_4$ respectively have a peripheral intermediate memory CACHE as an additional memory means. During the execution of switching-oriented processes, as a rule subscriber-related data are required. If these switching-oriented processes (such as for example an A-, or B-side occupation of the subscribers of subscriber connection networks AN1 . . . AN4, which subscribers are connected via one of the V5.2 interfaces S1 . . . S4) are processed in the peripheral installation $LTG_1$, the required subscriber-related data can be taken immediately from the system-inherent peripheral database DB of the $LTG_1$. The same holds for the processing of switching-oriented processes in the peripheral installation $LTG_2$.

If switching-oriented processes (such as for example an A- or B-side occupation of the subscribers of subscriber connection networks AN1 . . . AN4, which subscribers are connected via one of the V5.2 interfaces S1 . . . S4) are processed in the peripheral installation $LTG_3$, the required subscriber data of the peripheral installation keeping the subscriber-related data is requested. In the present exemplary embodiment, this is the peripheral installation $LTG_1$, or, respectively, in case this installation has been taken out of operation by a malfunction, the peripheral installation $LTG_2$. The subscriber-related data is then transmitted via the ring system R to the peripheral installation $LTG_3$, and is registered in the system-inherent peripheral intermediate memory CACHE. If necessary, subscriber data sets that are currently no longer needed are overwritten. This means that under certain circumstances subscriber-related data which is required frequently of the subscribers remain stored over a longer period of time. This is generally true of subscribers who telephone often. To this extent, it is useful that the peripheral installation $LTG_3$ that executes the switching-oriented traffic first determines whether the required subscriber-related data are stored in the system-inherent intermediate memory CACHE, and only afterwards accesses the peripheral installation $LTG_1$ or, respectively, $LTG_2$ that keeps such data. In this case, an access via the ring system R is then omitted, which is dynamically more advantageous.

In the case of peripheral installations that are duplicated and that are therefore more secure against failure, a duplication of this sort of the conducting of subscriber-related data can be dispensed with. In this case, exclusively one peripheral installation per interface to a subscriber connection network is defined for the storing of the subscriber-related data. In the case of V5.2 interfaces that conduct primary and secondary links to different duplicated peripheral units, the keeping of the subscriber-related data of the V5.2 interface can respectively be temporarily transmitted to the duplicated peripheral unit up to the C-channel standby circuit of the C-channel controlling the V5.2 interface, which peripheral unit has taken over the control of the V5.2 interface (what is known as the master function with respect to the V5.2 interface).

The dimensioning of the memory means ensues via an optimized adaptation to the set of subscriber-related data. Thus, the number m1 of the allowable databases DB per peripheral installation $LTG_1$ . . . $LTG_n$ for interfaces to subscriber connection networks AN is defined as $\geq 0$ and $\leq$ the number m2 of possible PCM terminations of the peripheral installation. A peripheral installation then comprises only one database DB for the subscriber-related data of an interface to subscriber connection networks, if this installation terminates at least one PCM path of this interface. The subscriber data memory of a peripheral installation will then be dimensioned at m1×A+(m2−m1)×B subscriber data sets, where A is the maximum number of subscriber data sets of an interface to subscriber connection networks (e.g. A=4000 for a fully expanded V5.2 interface having 16 PCM30 paths), and where $B \leq A$ is a reasonable number (e.g. B=250) of the subscriber data sets to be intermediately stored in CACHE on average per PCM path of an interface to subscriber connection networks.

According to the exemplary embodiment shown in FIG. 2, there accordingly result the following memory dimensionings, given the connection of four V5.2 interfaces respectively having 1000 subscribers:

$LTG_1$, $LTG_2$ respectively 4000 subscriber data sets (DB)

$LTG_3$, $LTG_4$ respectively 1000 subscriber data sets (CACHE)

If subscriber-related data is administratively altered, this must guide the alteration of all subscriber-related data, that is, it must be communicated to the installations in the communications system. Alterations of this type can be initiated by the operator or by the subscriber himself. For this purpose, the database DB of the central control installation CP will first incorporate the alterations. From there, an updating of the subscriber data sets in the databases DB of the peripheral installations $LTG_1$, $LTG_2$ then ensues. If necessary, the intermediate memories CACHE of the peripheral installations $LTG_3$, $LTG_4$ must also be updated with respect to the named alterations, or must be invalidated.

Figure 3:
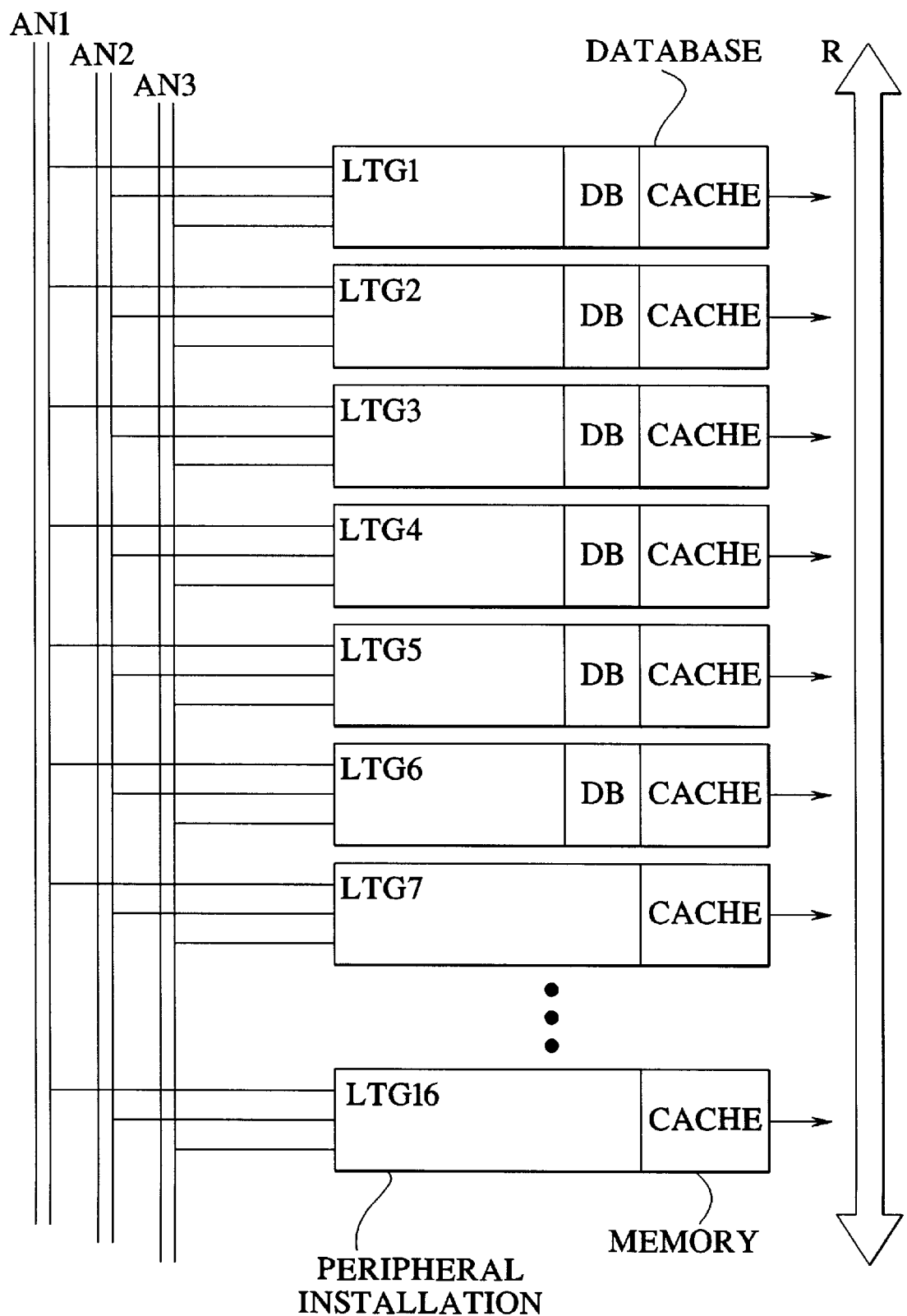
FIG. 3 depicts a configuration in which one peripheral installation per interface, as well as one additional peripheral installation per interface with regard to sufficient redundancy, conduct subscriber-related data.

FIG. 3 shows a further exemplary embodiment. Here, the subscriber-related data of three fully expanded interfaces, respectively having 16 PCM paths, are stored in interface-associated fashion in three peripheral installations, and, for reasons of redundancy, are stored in three further peripheral installations. This means that the subscriber-related data of the subscriber access network AN1 is stored in the database DB of the peripheral installation $LTG_1$. The peripheral installation $LTG_2$ is used as a further peripheral installation for the storing of such data. In the database DB present there, the subscriber-related data of the subscriber connection network AN1 is also stored, so that in case of error it is possible to fall back on the database of this peripheral installation. Furthermore, the subscriber-related data of the subscriber access network AN2 is stored in the database DB of the peripheral installation $LTG_3$. The peripheral installation $LTG_4$ serves as a further peripheral installation for storing these data. In the same way, the subscriber-related data of the subscriber connection network AN3 is stored in the database DB of the peripheral installation $LTG_5$, while the peripheral installation $LTG_6$ likewise stores such data as a further peripheral installation. The remaining peripheral installations $LTG_7$ . . . $LTG_{16}$ have only one intermediate memory CACHE. Analogously to the memory dimensioning shown for the preceding exemplary embodiment, in the present case the following memory dimensioning results under the same assumptions:

$LTG_1$ . . . $LTG_6$ respectively 4500 subscriber data sets (DB+CACHE)

$LTG_7$ . . . $LTG_{16}$ respectively 750 subscriber data sets (CACHE)

If the central control installation CP and the transmission system are sufficiently dimensioned, the presently specified method can be modified in such a way that the central control installation CP keeps all subscriber-related data in its system-inherent database DB. By this means, the memory requirement for the peripheral installations is further minimized, since in this case the databases DB in the peripheral installations are omitted. For storage purposes, the peripheral intermediate memories CACHE are then fully sufficient.

If V5.2 interfaces are connected to the communication system, it is advantageous for the minimization of the incoming message load to provide the peripheral installations that terminate the primary link and the secondary link with the databases DB for the subscriber data sets of the V5.2 interfaces.

If the software upgrade of the communication system is carried out so that a switching over takes place in the peripheral equipment to a background memory of the peripheral installation, which background memory is filled with the new program and the new data according to a new version of the software of the peripheral installation, then this memory, not used in normal operation, can be used for the purpose of storing the subscriber-related data. All relevant subscriber data sets are then available in normal operation in each peripheral installation. After a software upgrade, in the present case the memory regions for the peripheral intermediate memory CACHE are expanded to the full size of the required subscriber data memory, using the background memory, and are successively filled.

The exemplary embodiments described above show the relationships as they present themselves for V5.2 interfaces. The use of the inventive method is however not limited to V5.2 interfaces.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for storing subscriber-related data in communications systems, having a first plurality of subscriber connection networks, which are connected to peripheral installations of a communication system via a plurality of interfaces, comprising the steps of:

storing, via the communication system for the subscribers connected via a respective interface of the plurality of interfaces, subscriber-related data per interface;

exchanging information related to said data, via a transmission medium, between individual peripheral installations, and between the individual peripheral installations and a central control installation that stores subscriber-related data; and respectively storing in at least one peripheral installation of the peripheral installations each of the subscriber-related data of the subscribers connected via said respective interface.

2. The method according to claim 1, wherein each of the subscriber-related data of the subscribers connected via said respective interface is respectively stored in only one of the peripheral installations.

3. The method according to claim 1, wherein each of the subscriber-related data of the subscribers connected via said respective interface is respectively stored in only two of the peripheral installations.

4. The method according to claim 1, wherein the transmission medium is a system of communication rings, connected in a coupling field such that the coupling field interconnects the peripheral installations that are connected with a common interface.

5. The method according to claim 1, wherein a peripheral installation that stores subscriber-related data, which installation requires particular subscriber-related data during execution of switching-oriented processes, takes such data from a system-inherent peripheral database.

6. A method for storing subscriber-related data in communications systems, having a first plurality of subscriber connection networks, which are connected to peripheral installations of a communication system via a plurality of interfaces, comprising the steps of:

storing, via the communication system for the subscribers connected via a respective interface of the plurality of interfaces, subscriber-related data per interface;

exchanging information related to said data, via a transmission medium, between individual peripheral installations, and between the individual peripheral installations and a central control installation that stores subscriber-related data;

respectively storing in at least one peripheral installation of the peripheral installations each of the subscriber-related data of the subscribers connected via said respective interface;

taking via a respective peripheral installation that, during the execution of switching-oriented processes, requires particular subscriber-related data that the respective peripheral installation does not store, such data from one of a respectively allocated system-inherent peripheral intermediate memory and the peripheral installation in which such subscriber-related data is stored, and, when the particular subscriber-related data is taken from the peripheral installation in which the subscriber related data is stored, the respective peripheral installation supplying such data to the respectively allocated system-inherent intermediate memory.

7. The memory according to claim 1, wherein administrative alterations of subscriber-related data are carried out in a database of the central control installation, whereupon an updating of such data is carried out by said control installation in the peripheral databases of the peripheral installations that keep the relevant subscriber-related data, and where said control installation also indirectly effects an updating or an invalidation of such data in peripheral intermediate memories.

8. The method according to claim 1, wherein interfaces of said plurality of interfaces are V5.2 interfaces, and where a peripheral installation that terminates a primary link is a peripheral installation that keeps subscriber-related data, and where a peripheral installation that terminates a secondary link is a further peripheral installation that keeps subscriber-related data.

9. A method for storing subscriber-related data in communication systems, having a first plurality of subscriber connection networks, which are connected to peripheral installations of a communication system via a plurality of interfaces, comprising the steps of:

exchanging information, via a transmission medium, between individual peripheral installations of the peripheral installations, as well as between the peripheral installations and a central control installation that keeps subscriber-related data;

keeping, via the central control installation, the subscriber-related data in a system-inherent database as the sole installation of the communication system, and making the peripheral installations available as needed.

10. A method for storing subscriber-related data in communications systems, having a first plurality of subscriber connection networks, which are connected to peripheral installations of a communication system via a plurality of interfaces, comprising the steps of:

keeping, via the communication system for the subscribers connected via a respective interface of the plurality of interfaces, subscriber-related data per interface;

exchanging information, via a transmission medium, between individual peripheral installations, and between the individual peripheral installations and a central control installation that keeps subscriber-related data; and storing each of the subscriber-related data of the subscribers connected via said respective interface in only one of the peripheral installations.

11. The method according to claim 10, wherein the transmission medium is a system of communication rings, connected in a coupling field such that the coupling field interconnects the peripheral installations that are connected with a common interface.

12. The method according to claim 10, wherein a peripheral installation that stores subscriber-related data, which installation requires particular subscriber-related data during execution of switching-oriented processes, takes such data from a system-inherent peripheral database.

13. The method according to claim 10, wherein a respective peripheral installation that, during the execution of switching-oriented processes, requires particular subscriber-related data that the respective peripheral installation does not store, takes such data from one of a respectively allocated system-inherent peripheral intermediate memory and the peripheral installation in which such subscriber-related data is stored, and, when the particular subscriber-related data is taken from the peripheral installation in which the subscriber related data is stored, the respective peripheral installation supplies such data to the respectively allocated system-inherent intermediate memory.

14. The memory according to claim 10, wherein administrative alterations of subscriber-related data are carried out in a database of the central control installation, whereupon an updating of such data is carried out by said control installation in the peripheral databases of the peripheral installations that store the relevant subscriber-related data, and wherein said control installation also indirectly effects an updating or an invalidation of such data in the peripheral intermediate memories.

15. The method according to claim 10, wherein interfaces of said plurality of interfaces are V5.2 interfaces, and wherein a peripheral installation that terminates a primary link is defined as a peripheral installation that keeps subscriber-related data, and wherein a peripheral installation that terminates a secondary link is a further peripheral installation that keeps subscriber-related data.

\* \* \* \* \*